US012045579B1

(12) United States Patent
Walter

(10) Patent No.: US 12,045,579 B1
(45) Date of Patent: Jul. 23, 2024

(54) SYSTEMS AND METHODS FOR GENERATING LEGAL DOCUMENT DRAFTS

(71) Applicant: The Simple Associate, Inc., San Rafael, CA (US)

(72) Inventor: Nathan Walter, San Rafael, CA (US)

(73) Assignee: The Simple Associate, Inc., San Rafael, CA (US)

( * ) Notice: Subject to any disclaimer, the term of this patent is extended or adjusted under 35 U.S.C. 154(b) by 0 days.

(21) Appl. No.: 18/359,573

(22) Filed: Jul. 26, 2023

(51) Int. Cl.
*G06F 40/40* (2020.01)
*G06F 40/106* (2020.01)
*G06F 40/186* (2020.01)

(52) U.S. Cl.
CPC ............ *G06F 40/40* (2020.01); *G06F 40/106* (2020.01); *G06F 40/186* (2020.01)

(58) Field of Classification Search
None
See application file for complete search history.

(56) References Cited

U.S. PATENT DOCUMENTS

| | | | | |
|---|---|---|---|---|
| 2006/0010377 A1* | 1/2006 | Anecki | .................. | G06Q 10/10 715/255 |
| 2008/0172239 A1* | 7/2008 | Henderson | ............. | G06Q 10/10 705/311 |
| 2020/0012709 A1* | 1/2020 | Kogler | .................. | G06F 40/186 |
| 2020/0242306 A1* | 7/2020 | Liu | ........................ | G06F 40/131 |
| 2022/0014582 A1* | 1/2022 | Brodkowitz | ............ | H04L 67/14 |
| 2023/0274084 A1* | 8/2023 | Modani | ................. | G06F 40/186 715/243 |

OTHER PUBLICATIONS

Subrin & Main, "The Integration of Law and Fact in an Uncharted Parallel Procedural Universe", Notre Dame L. Rev., 79(5), 1981-2024, 2004. (Year: 2004).*

* cited by examiner

*Primary Examiner* — Nicole A K Schmieder
(74) *Attorney, Agent, or Firm* — Esplin & Associates, PC

(57) ABSTRACT

Systems and methods for generating legal document drafts for individual cases based on case content and exemplary segments of legal documents. Exemplary implementations may: store case content for individual cases, obtain first case content for a first case from electronic storage, provide the first case content and/or user-provided context values as input to a large language model, provide one or more prompts to the large language model that configure the model to generate a first document draft, obtain output from the large language model including the first document draft, provide the first document draft to a user, and/or other exemplary implementations.

18 Claims, 3 Drawing Sheets

US 12,045,579 B1

SYSTEMS AND METHODS FOR GENERATING LEGAL DOCUMENT DRAFTS

FIELD OF THE DISCLOSURE

The present disclosure relates to systems and methods for generating legal document drafts for individual cases based on case content and exemplary segments of legal documents.

BACKGROUND

Large language models for text summarization and text generation are known. Chatbots, virtual assistants, conversational AI, and other types of interactive language models are known.

SUMMARY

Drafting legal documents may be a tiresome and time-consuming task. For example, in the context of litigation, an associate's work may consist of reviewing numerous, repetitive questions and document production demands then drafting lengthy repetitive responses to those questions and demands. Despite the routine nature of this process, associates must expend many hours to verify the documents are reviewed precisely and polished prior to delivery to opposing counsel. As such, there exists a need to streamline document drafting while ensuring the accuracy of the final product. By utilizing machine learning, attorneys may be able to automatically generate documents based on previously written documents and/or populate fields in document templates based on information inputted by associates.

One or more aspects of the present disclosure include a system for generating legal document drafts for individual cases based on case content and exemplary segments of legal documents. The system may include electronic storage, one or more hardware processors configured by machine-readable instructions, and/or other components. Executing the machine-readable instructions may cause the one or more hardware processors to facilitate generating legal document drafts. The machine-readable instructions may include one or more computer program components. The one or more computer program components may include one or more of a content component, a model component, a document component, and/or other components.

The electronic storage may store case content for individual cases and/or other information. Case content for individual ones of the cases may include factual information, legal information, exemplary segments of legal documents, and/or other information. The factual information may include information derived from content associated with individual ones of the cases, information acquired from users associated with individual ones of the cases, and/or other types of information. The legal information may include legal principles, case law relevant to individual ones of the cases, and/or information.

The content component may be configured to obtain first case content for a first case from electronic storage. The first case content may include factual information, legal information, and/or other information relevant to the first case. The first case content may further include one or more exemplary segments of legal documents.

The model component may be configured to provide the first case content and/or user-provided context values as input to a large language model. The context values may identify one or more of a document type, a document objective, and/or other information.

The model component may be configured provide one or more prompts to the large language model that configure the model to generate a first document template. The first document template may be generated based on the one or more exemplary segments of legal documents included in the first case content, the user provided context values, and/or other information. The first document template may include one or more fields for inserting case-specific information. The one or more prompts may configure the large language model to, for individual ones of the fields, determine and insert case-specific information for the first case to generate a first document draft. The case-specific information may be determined based on the factual information, legal information, and/or other information relevant to the first case. The one or more prompts may configure the large language model to output the first document draft.

The document component may be configured to obtain output from the large language model. The output may include the first document draft.

The document component may be configured to provide the first document draft to a user.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
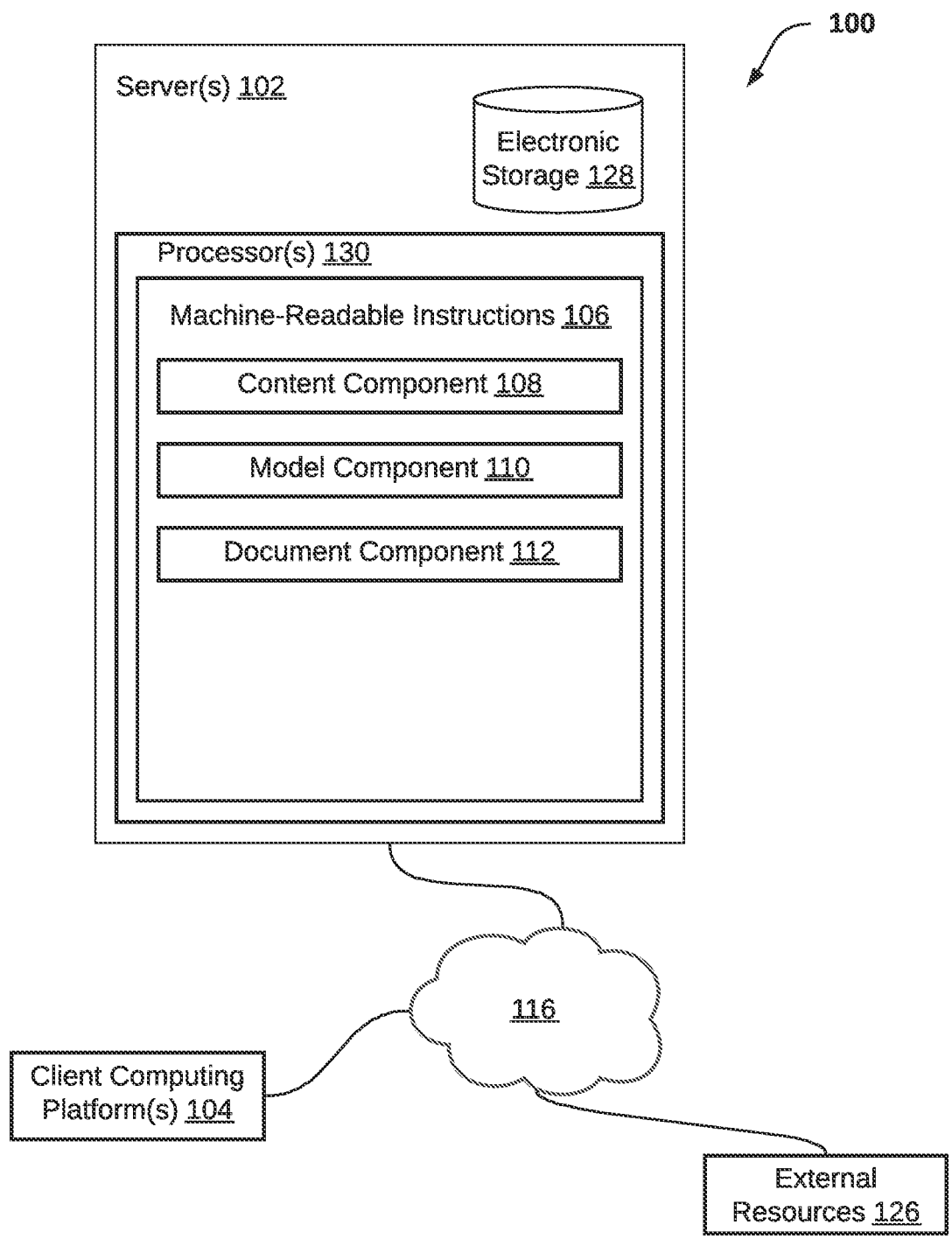
FIG. 1 illustrates a system for generating legal document drafts for individual cases based on case content and exemplary segments of legal documents, in accordance with one or more implementations.

FIG. 1 illustrates a system 100 configured for generating legal document drafts for individual cases based on case content and exemplary segments of legal documents, in accordance with one or more implementations. In some implementations, system 100 may include one or more server(s) 102. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Executing the machine-readable instructions 106 may cause server(s) 102 to facilitate generating legal document drafts for individual cases based on case content and exemplary segments of legal documents. Machine-readable instructions 106 may include one or more instruction components. The instruction components may include computer program components. The instruction components may include one or more of content component 108, model component 110, document component 112, and/or other instruction components.

Electronic storage 128 may be configured to store case content for individual cases and/or other information. Case content for individual ones of the cases may include factual information, legal information, exemplary segments of legal documents, and/or other information. The factual information may include information derived from content associated with individual ones of the cases, information acquired from users associated with individual ones of the cases, and/or other types of information. By way of non-limiting illustration, content may include deposition transcripts, deposition recordings, police reports, written witness statements, emails, and/or other types of content. Content may describe facts of the underlying case (e.g., details of incidents associated with individual ones of the cases), procedural details (e.g., document filings, filing dates, court dates, etc.), and/or other information. The legal information may include legal principles, legal theories, case law relevant to individual ones of the cases, and/or information. Relevant case law may be determined based on the factual information included in the case content for individual ones of the cases. By way of non-limiting illustration, relevant case law for an individual case may include one or more cases having similar facts, the same jurisdiction, and/or other similarities to the individual case.

In some implementations, exemplary segments of legal documents may be included in case content for individual ones of the cases. Individual exemplary segments of legal document may be included in case content for one or more individual cases. By way of non-limiting illustration, a first exemplary segment may be included in case content for a first case and a second case. The second case may be separate and distinct from the first case. Individual exemplary segments of legal documents may be defined and/or described by segment information. Segment information for an individual exemplary segment may identify an author that created the individual exemplary segment, a segment type, a document type, a document objective, and/or other characteristics of the individual exemplary segment. Segment information for the individual exemplary segment may be stored in electronic storage 128. In some implementations, exemplary segments of legal documents may include portions of legal documents, entire legal documents, and/or multiple legal documents. The exemplary segments of legal documents may be obtained from a managed document repository (e.g., via external resource(s) 126) and/or other sources. A managed document repository (i.e., case management system) may include a database for storing, organizing, and handling legal documents.

Content component 108 may be configured to obtain first case content for a first case from electronic storage 128. In some implementations, content component 108 may be configured to obtain first case content responsive to user selection of the first case. By way of non-limiting illustration, content component 108 may present a user with a selection interface (i.e., via client computing platform(s) 104) having one or more selectable user interface elements corresponding to individual ones of the cases. The first case content may include factual information, legal information, and/or other information relevant to the first case. The factual information included in the first case content may include information derived from content associated with the first case, information acquired from users associated with the first case, and/or other types of information. The legal information included in the first case content may include legal principles and/or theory, case law relevant to the first case, and/or other information. The first case content may further include one or more exemplary segments of legal documents. In some implementations, the one or more exemplary segments of legal documents may be written in association with one or more other cases that are distinct and separate from the first case. The one or more exemplary segments of legal documents may be of a document type that is the same as or similar to the type of document intended to be generated for the first case.

In some implementation, content component 108 may be configured to obtain items of content associated with the first case. Content associated with the first case may include one or more of text, audio, video, and/or other types of content. By way of non-limiting illustration, content associated with the first case may include documents, recordings, emails, text messages, reports, and/or other types of content. Content may be obtained from one or more users (e.g., via client computing platform(s) 104), external resources 126, and/or other components of system 100. In some implementations, content component 108 may be configured to receive content associated with the first case inputted (e.g., uploaded) by one or more users. In some implementations, users may provide access to managed document repositories (i.e., case management systems). Obtaining content associated with the first case may include accessing and/or obtaining one or more case files associated with the first case from the managed document repositories. The one or more case files may include one or more individual items of content associated with the first case.

Content component 108 may be configured to provide the obtained item(s) of content as input to a language processing model configured to extract and/or output factual information contained within the obtained item(s) of content. In some implementations, the language processing model may be stored in electronic storage 128 and/or obtained from external resources(s) 126 and/or accessed through one or more network(s) 116. Input to the language processing model may include the one or more individual items of content obtained from the managed document repositories, uploaded by users, and/or obtained from other sources. In some implementations, the language processing model may utilize optical character recognition, speech recognition, machine learning, and/or other processes for extracting information from inputs to the model. Inputs to the language processing model may include one or more user-provided parameters that specify and/or indicate types of information to be extracted from the provided inputs. Types of information may describe procedural aspects of the first case, factual information underlying the first case, and/or other types of information. By way of non-limiting illustration, types of information may include parties, damages (direct and consequential), location(s) of incident/event, and/or classifications. In some implementations, the language processing model may be configured to label information extracted from the provided inputs. The language processing model may be configured to determine one or more labels for extracted information based on the user-provided parameters. Content component 108 may be configured to store (e.g., in electronic storage 128) information extracted and/or outputted by the language processing model as factual information relevant to the first case.

In some implementations, content component 108 may be configured to obtain an interactive language model. The interactive language model may be stored in electronic storage 128 and/or obtained from external resources(s) 126 and/or accessed through one or more network(s) 116. By way of non-limiting illustration, the interactive language model may be a chatbot, a virtual assistant, and/or other types of language models. The interactive language model may be configured to provide stimulus to individual users via a user interface. Users may access the user interface via client computer platform(s) 104. Stimulus may include questions, statements, and/or other types of prompts. In some implementations, stimulus may be generated and/or provided to elicit a response from the user that contains specific information (i.e., factual information). The interactive language model may be further configured to receive user responses to the provided stimulus. User responses may be entered and/or selected by users via the user interface. Content component 108 may store the user responses in electronic storage 128. In some implementations, the interactive language model may be configured to generate and/or provide follow-up stimulus based on received user responses to previously provided stimulus. The follow-up stimulus may be generated to elicit user responses that include specific information associated with individual ones of the cases. Content component 108 may be configured to receive and store user-provided responses to the follow-up stimulus (e.g., in electronic storage 128). Factual information acquired from users associated with the individual ones of the cases may include the user responses to stimulus and/or follow-up stimulus.

In some implementations, content component 108 may be configured to determine discrepancies between factual information contained in user responses to provided stimulus and factual information previously stored in association with the first case. By way of non-limiting illustration, stored factual information may indicate an incident date having a first value and a user response to stimulus may indicate the incident date having a second value. The first value being separate and distinct from the second value. Content component 108 may determine a discrepancy between the first value and the second value for the incident date. Responsive to the determination, content component 108 may be configured to notify the user of the discrepancy and/or receive user input confirming (i.e., selecting) the correct value.

In some implementations, content component 108 may be configured to obtain factual information, legal information, and/or other types of information associated with an individual case. Factual information may be obtained from content associated with the individual case, user associated with the individual case, and/or other sources. Legal information may be obtained from one or more managed repositories. The one or more managed repositories may be included in electronic storage 128 and/or other components of system 100. Legal information may be obtained from one or more external repositories (e.g., included in external resources 126). In some implementations, content component 108 may be configured to obtain legal information from one or more repositories based on obtained factual information and/or other information. By way of non-limiting illustration, content component 108 may be configured to execute a search for "Breach of Contract" within one or more repository based on factual information indicating the individual case is associated with a breach of contract.

Content component 108 may be configured to determine one or more key values based on the factual information associated with the individual case. Individual ones of the key values may describe one or more aspects of the individual case. By way of non-limiting illustration, aspects of the individual case may include a type of case for the individual case, an incident and/or event associated with the individual case, an amount of damages, a description of the incident and/or event, jurisdiction, and/or other characteristics and/or details of the individual case. Content component 108 may be configured to filter the obtained factual information, legal information, and/or other types of information based on the determined key values for the individual case. By way of non-limiting illustration, content component 108 may be configured to identify (of the obtained factual information and/or legal information) information relevant to the individual case based on the key values. Content component 108 may be configured to aggregate the filtered factual information, legal information, and/or other types of information to generate case content for the individual case. Content component 108 may be configured to store the case content for the individual case in electronic storage 128.

Model component 110 may provide the first case content, user-provided context values, and/or other information as input to a large language model. The large language model may be obtained from electronic storage 128, external resources(s) 126 and/or accessed through one or more network(s) 116. Model component 110 may be configured to receive user input (e.g., via client computing platform(s) 104) specifying one or more context values. The context values may describe and/or indicate a desired output to be generated by the large language model. The context values may identify one or more of a document type, a document objective, and/or other information. The document type may be a demand letter, pleadings, demurrers, notices, motions, and/or other types of legal documents. The document objective may specify a purpose and/or goal to be accomplished by the generated document.

Model component 110 may be configured provide one or more prompts to the large language model that configure the model to generate a first document draft for the first case. The one or more prompts may include instructions for the large language model. The instructions may be in a human-readable or machine-readable format. The instructions may initiate generation of the first document draft for the first case. The one or more prompts may configure the large language model to generate a first document template. The first document template may be generated based on the one or more exemplary segments of legal documents included in the first case content, the user provided context values, and/or other information. In some implementations, the first document template may be generated in a style and/or format based on the style and/or format of the one or more exemplary segments of legal documents included in the first case content. The first document template may include one or more fields for inserting case-specific information and/or other components. Individual fields may be defined by a position within the document template, a type of case-specific information to be inserted, and/or other information.

The one or more prompts may configure the large language model to, for individual ones of the fields, determine and insert case-specific for the first case to generate a first document draft. The case-specific information may be determined based on the factual information, legal information, and/or other information relevant to the first case. In some implementations, case-specific information may be determined based on the type of case-specific information associated with individual ones of the fields. By way of non-limiting illustration, the first document template may include a first field and/or other components. The first field may be associated with a first type of case-specific information (e.g., date of incident). The first document draft may be generated by determining and inserting a first field value (e.g., Jan. 1, 2023) at the first field. The one or more prompts may configure the large language model to output the first document draft.

Document component 112 may be configured to obtain output from the large language model. The output may include the first document draft and/or other information. Document component 112 may be configured to provide the first document draft to a user. In some implementations, document component 112 may be configured to provide the first document draft to a user for review. Document component 112 may be configured to receive user input specifying one or more modifications to the first document draft. Modifications to the first document draft may include adding language, removing language, and/or other types of modifications. Document component 112 may be configured to implement the one or more modifications to the first document draft generate a first final document for the first case. Document component 112 may be configured to provide the first final document to the user.

Figure 3A:
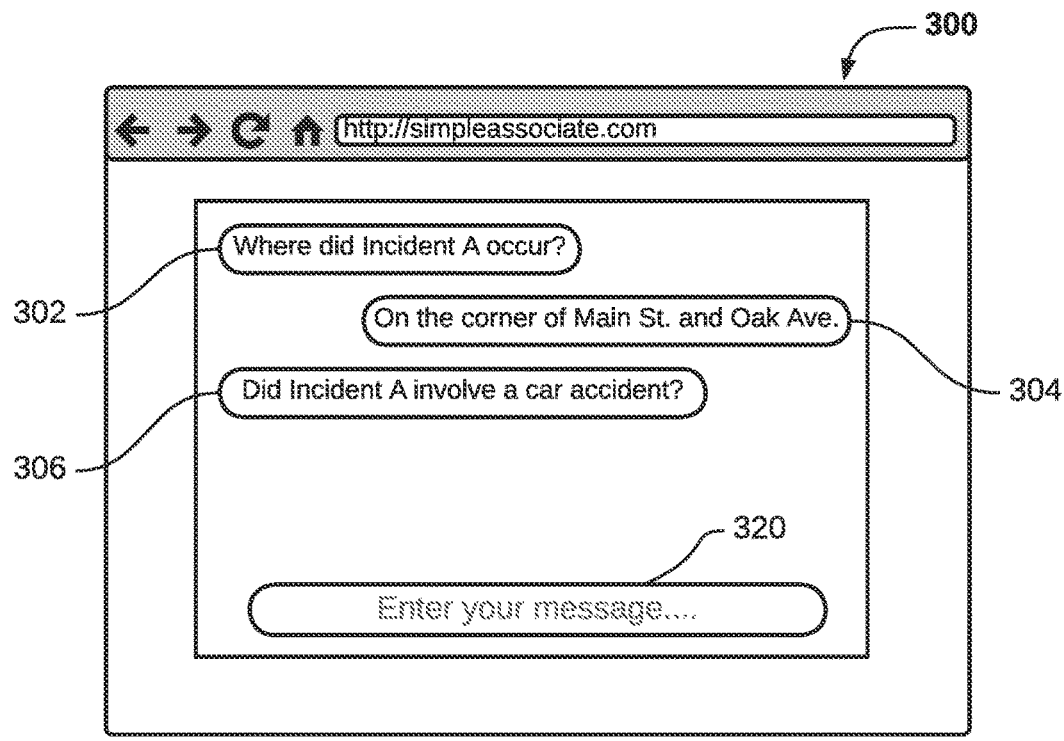
FIGS. 3A-B illustrates a user interface, in accordance with one or more implementations.
Figure 3B:
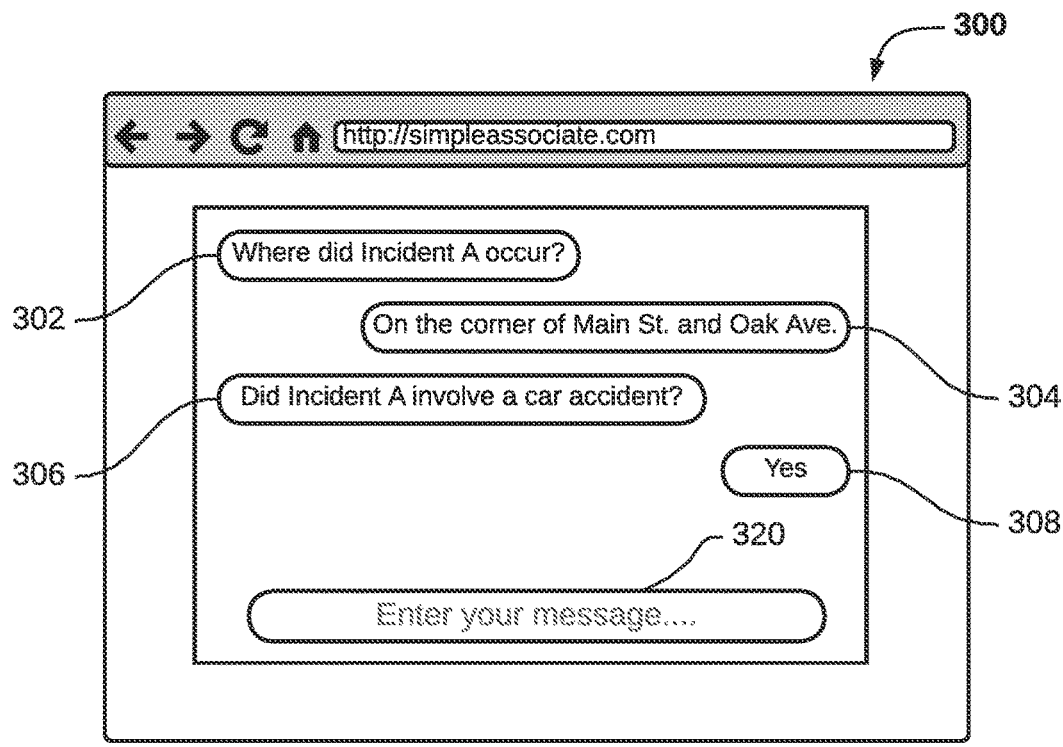

FIGS. 3A-B illustrates a user interface 300 in accordance with one or more implementations. User interface 300 may include a first interface element 302, a second interface element 304, a third interface element 306, a first input field 320, and/or other user interface elements. First interface element 302 may correspond with and/or present a first stimulus provided to a user by an interactive language model. Second interface element 304 may correspond with a first user response to the first stimulus. In some implementations, the user may submit the first user response to the first stimulus via first input field 320. The interactive language model may be configured to receive the first user response. In some implementations, the interactive language model may be configured to extract factual information from the first user response and/or store the extracted factual information (e.g., in electronic storage 128). Third interface element 306 may correspond with and/or present a second stimulus provided to the user by the interactive language model. In some implementations, the interactive language model may be configured to generate the second stimulus based on the first user response to the first stimulus. Referring to FIG. 3B, user interface 300 may include a fourth interface element 308 and/or other user interface elements. Fourth interface element may correspond with a second user response to the second stimulus. The user may submit the second user response to the second stimulus via first input field 320. In some implementations, the interactive language model may be configured to extract factual information from the second user response and/or store the extracted factual information (e.g., in electronic storage 128.

In some implementations, server(s) 102, client computing platform(s) 104, and/or external resources 126 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user corresponding to the given client computing platform 104 to interface with system 100 and/or external resources 126, and/or provide other functionality attributed herein to client computing platform(s) 104. By way of non-limiting example, the given client computing platform 104 may include one or more of a desktop computer, a laptop computer, a handheld computer, a tablet computing platform, a Smartphone, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include electronic storage 128, one or more processors 130, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, and/or 112, and/or other components. Processor(s) 130 may be configured to execute components 108, 110, and/or 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, and/or 112.

Figure 2:
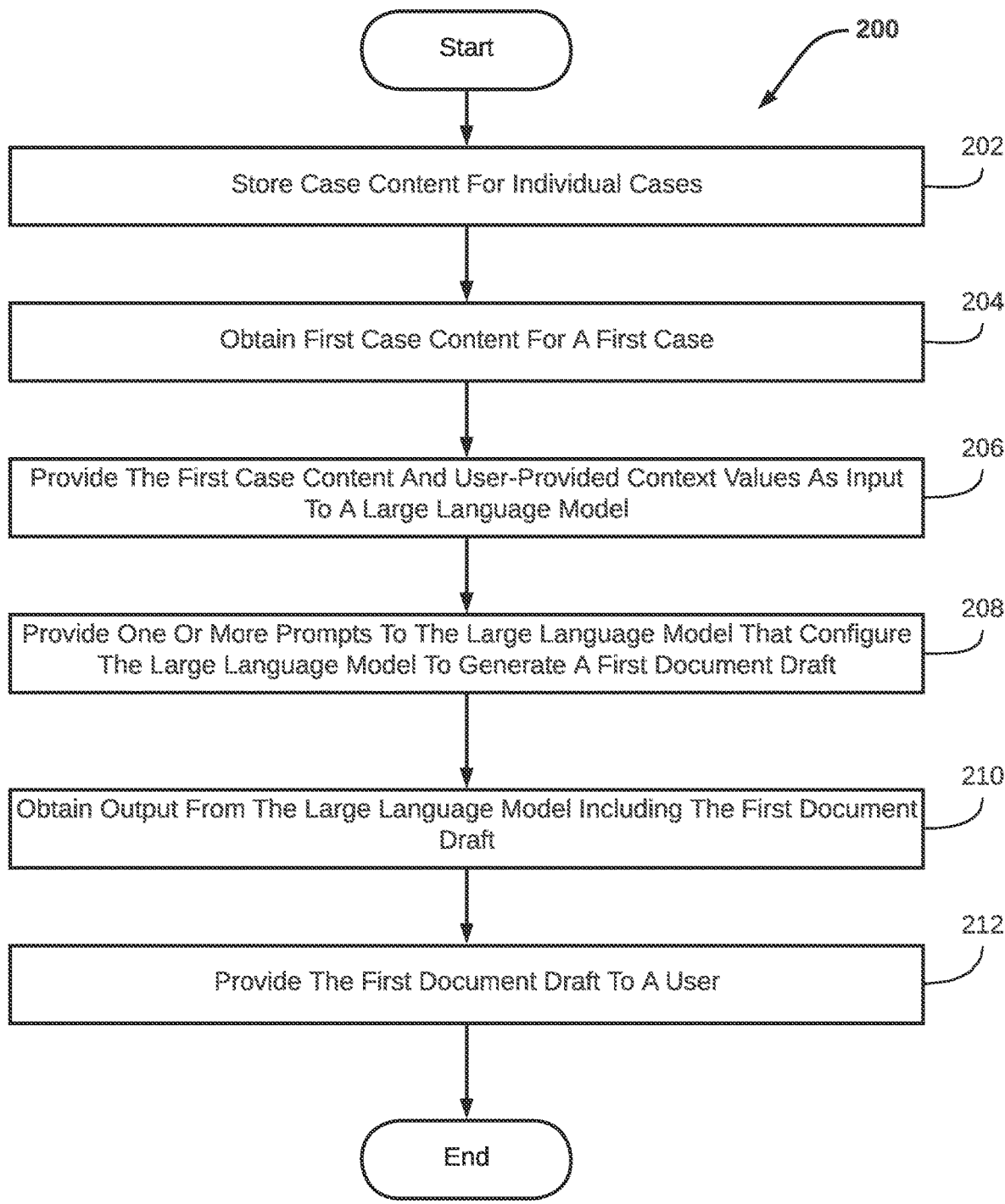
FIG. 2 illustrates a method for generating legal document drafts for individual cases based on case content and exemplary segments of legal documents, in accordance with one or more implementations.

FIG. 2 illustrates a method 200 for generating legal document drafts for individual cases based on case content and exemplary segments of legal documents, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing case content for individual cases and/or other information. Case content for individual ones of the cases may include factual information, legal information, exemplary segments of legal documents, and/or other information. The factual information may include information derived from content associated with individual ones of the cases, information acquired from users associated with individual ones of the cases, and/or other types of information. The legal information may include legal principles, case law relevant to individual ones of the cases, and/or information. Operation 202 may be performed by one or more components that are the same as or similar to electronic storage 128, in accordance with one or more implementations.

An operation 204 may include obtaining first case content for a first case from electronic storage. The first case content may include factual information, legal information, and/or other information relevant to the first case. The first case content may further include one or more exemplary segments of legal documents. Operation 204 may be performed by one or more hardware processors configured by machine-readable instructions including a component that is the same as or similar to content component 108, in accordance with one or more implementations.

An operation 206 may include providing the first case content and/or user-provided context values as input to a large language model. The context values may identify one or more of a document type, a document objective, and/or other information. Operation 206 may be performed by one or more hardware processors configured by machine-readable instructions including a component that is the same as or similar to model component 110, in accordance with one or more implementations.

An operation 208 may include providing one or more prompts to the large language model that configure the model to generate a first document template. The first document template may be generated based on the one or more exemplary segments of legal documents included in the first case content, the user provided context values, and/or other information. The first document template may include one or more fields for inserting case-specific information. The one or more prompts may configure the large language model to, for individual ones of the fields, determine and insert case-specific for the first case to generate a first document draft. The case-specific information may be determined based on the factual information, legal information, and/or other information relevant to the first case. The one or more prompts may configure the large language model to output the first document draft. Operation 208 may be performed by one or more hardware processors configured by machine-readable instructions including a component that is the same as or similar to model component 110, in accordance with one or more implementations.

An operation 210 may include obtaining output from the large language model. The output may include the first document draft and/or other information. Operation 210 may be performed by one or more hardware processors configured by machine-readable instructions including a component that is the same as or similar to document component 112, in accordance with one or more implementations.

An operation 212 may include providing the first document draft to a user. Operation 212 may be performed by one or more hardware processors configured by machine-readable instructions including a component that is the same as or similar to document component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to generate document templates for individual cases based on exemplary segments of legal documents, wherein legal document drafts for the individual cases are generated based on the document templates and case content for the individual cases, the system comprising:
electronic storage that stores the case content for the individual cases, wherein the case content for individual ones of the cases includes factual information, legal information, and the exemplary segments of legal documents associated with the individual ones of the cases, wherein the factual information includes information derived from content associated with the individual ones of the cases and information acquired from users associated with the individual ones of the cases, and wherein the legal information includes legal principles and case law relevant to the individual ones of the cases;
one or more physical processors configured by machine-readable instructions to:
obtain, from the electronic storage, first case content for a first case, wherein the first case content includes factual information and legal information relevant to the first case, wherein the first case content further includes one or more exemplary segments of legal documents;
provide the first case content and user-provided context values as input to a large language model, wherein the user-provided context values identify at least one of a document type and a document objective;
provide one or more prompts to the large language model that configure the large language model to:
generate a first document template based on the one or more exemplary segments of legal documents included in the first case content and the user-provided context values, wherein the first document template is generated in a style based on the style of the one or more exemplary segments of legal documents included in the first case content, wherein the first document template includes one or more fields for inserting case-specific information;
for individual ones of the one or more fields of the first document template, determine and insert case-specific information for the first case to generate a first document draft, wherein the case-specific information for the first case is determined based on the factual information and the legal information relevant to the first case;
output the first document draft;
obtain output from the large language model, wherein the output includes the first document draft; and
provide the first document draft to a user.

2. The system of claim 1, wherein the one or more physical processors are further configured to:
obtain an interactive language model configured to provide stimulus to individual users and receive user responses to the provided stimulus, wherein the received user responses include the factual information associated with the individual ones of the cases, and store the received user responses in the electronic storage, and wherein the factual information acquired from the users associated with the individual ones of the cases includes the received user responses.

3. The system of claim 2, wherein the interactive language model is further configured to:
generate and provide follow-up stimulus based on the received user responses to previously provided stimulus, wherein the follow-up stimulus is generated to elicit additional user responses that include specific information associated with the individual ones of the cases; and
receive and store the additional user responses to the follow-up stimulus in the electronic storage.

4. The system of claim 1, wherein the one or more physical processors are further configured by machine readable instructions to:
obtain content associated with the first case, wherein the content associated with the first case includes one or more of text, audio, and video content;
provide the obtained content as input to a language processing model configured to extract and output factual information contained within the obtained content, wherein the extracted factual information describes aspects of the first case;
obtain output generated by the language processing model based on the provided input; and
store the obtained output in the electronic storage.

5. The system of claim 1, wherein the one or more physical processors are further configured to:
obtain the factual information and the legal information associated with an individual case;
determine, based on the factual information associated with the individual case, one or more key values, wherein the one or more key values describe individual aspects of the individual case, and wherein aspects of the individual case include at least one of a type of case for the individual case, an incident and/or event associated with the individual case, an amount of damages, and a description of the incident and/or event.

6. The system of claim 5, wherein the one or more physical processors are further configured to:
filter the obtained factual information and the obtained legal information based on the determined key values for the individual case;
aggregate the filtered factual information and the filtered legal information to generate case content for the individual case; and
store the case content for the individual case in the electronic storage.

7. The system of claim 1, wherein the legal information is obtained from one or more managed repositories.

8. The system of claim 1, wherein the document type includes a demand letter, pleadings, demurrers, notices, and motions.

9. The system of claim 1, wherein the large language model is stored in the electronic storage.

10. A method for generating document templates for individual cases based on exemplary segments of legal documents, wherein legal document drafts for the individual cases are generated based on the document templates and case content for the individual cases, the method comprising:
storing the case content for the individual cases, wherein the case content for individual ones of the cases includes factual information, legal information, and the exemplary segments of legal documents associated with the individual ones of the cases, wherein the factual information includes information derived from content associated with the individual ones of the cases and information acquired from users associated with the individual ones of the cases, and wherein the legal information includes legal principles and case law relevant to the individual ones of the cases;

obtaining first case content for a first case, wherein the first case content includes factual information and legal information relevant to the first case, wherein the first case content further includes one or more exemplary segments of legal documents;

providing the first case content and user-provided context values as input to a large language model, wherein the user-provided context values identify at least one of a document type and a document objective;

providing one or more prompts to the large language model that configure the large language model to:

generate a first document template based on the one or more exemplary segments of legal documents included in the first case content and the user-provided context values, wherein the first document template is generated in a style based on the style of the one or more exemplary segments of legal documents included in the first case content, wherein the first document template includes one or more fields for inserting case-specific information;

for individual ones of the one or more fields of the first document template, determine and insert case-specific information for the first case to generate a first document draft, wherein the case-specific information for the first case is determined based on the factual information and the legal information relevant to the first case;

output the first document draft;

obtaining output from the large language model, wherein the output includes the first document draft; and providing the first document draft to a user.

11. The method of claim 10, wherein the method further comprises:

obtaining an interactive language model configured to provide stimulus to individual users and receive user responses to the provided stimulus, wherein the received user responses include the factual information associated with the individual ones of the cases, and storing the received user responses, and wherein the factual information acquired from the users associated with the individual ones of the cases includes the received user responses.

12. The method of claim 11, wherein the method further comprises:

generating and providing follow-up stimulus based on the received user responses to previously provided stimulus, wherein the follow-up stimulus is generated to elicit additional user responses that include specific information associated with the individual ones of the cases; and receiving and storing the additional user responses to the follow-up stimulus.

13. The method of claim 10, wherein the method further comprises:

obtaining content associated with the first case, wherein the content associated with the first case includes one or more of text, audio, and video content;

providing the obtained content as input to a language processing model configured to extract and output factual information contained within the obtained content, wherein the extracted factual information describes aspects of the first case;

obtaining output generated by the language processing model based on the provided input; and storing the obtained output.

14. The method of claim 10, wherein the method further comprises:

obtaining the factual information and the legal information associated with an individual case;

determining, based on the factual information associated with the individual case, one or more key values, wherein the one or more key values describe individual aspects of the individual case, and wherein aspects of the individual case include at least one of a type of case for the individual case, an incident and/or event associated with the individual case, an amount of damages, and a description of the incident and/or event.

15. The method of claim 14, wherein the method further comprises:

filtering the obtained factual information and the obtained legal information based on the determined key values for the individual case;

aggregating the filtered factual information and the filtered legal information to generate case content for the individual case; and storing the case content for the individual case.

16. The method of claim 10, wherein the legal information is obtained from one or more managed repositories.

17. The method of claim 10, wherein the document type includes a demand letter, pleadings, demurrers, notices, and motions.

18. The method of claim 10, wherein the large language model is stored in electronic storage.

* * * * *